(12) United States Patent
Yanagihara et al.

(10) Patent No.: US 9,112,222 B2
(45) Date of Patent: *Aug. 18, 2015

(54) LITHIUM ION SECONDARY BATTERY ACTIVE MATERIAL, LITHIUM ION SECONDARY BATTERY ELECTRODE, LITHIUM ION SECONDARY BATTERY, ELECTRONIC DEVICE, ELECTRONIC POWER TOOL, ELECTRIC VEHICLE, AND POWER STORAGE SYSTEM

(75) Inventors: Asuki Yanagihara, Fukushima (JP); Satoshi Fujiki, Fukushima (JP); Yosuke Hosoya, Fukushima (JP); Guohua Li, Fukushima (JP)

(73) Assignee: SONY CORPORATION (JP)

( * ) Notice: Subject to any disclaimer, the term of this patent is extended or adjusted under 35 U.S.C. 154(b) by 411 days.

This patent is subject to a terminal disclaimer.

(21) Appl. No.: 13/549,129

(22) Filed: Jul. 13, 2012

(65) Prior Publication Data

US 2014/0017566 A1    Jan. 16, 2014

(51) Int. Cl.
| | |
|---|---|
| *H01M 4/485* | (2010.01) |
| *H01M 4/505* | (2010.01) |
| *H01M 4/525* | (2010.01) |
| *H01M 4/58* | (2010.01) |
| *H01M 4/587* | (2010.01) |
| *H01M 4/36* | (2006.01) |
| *C01G 23/00* | (2006.01) |
| *C01B 25/45* | (2006.01) |
| *H01M 4/02* | (2006.01) |
| *H01M 4/131* | (2010.01) |
| *H01M 4/136* | (2010.01) |
| *H01M 10/0525* | (2010.01) |

(52) U.S. Cl.
CPC .............. *H01M 4/366* (2013.01); *C01B 25/45* (2013.01); *C01G 23/005* (2013.01); *H01M 4/485* (2013.01); *H01M 4/505* (2013.01); *H01M 4/525* (2013.01); *H01M 4/587* (2013.01); *H01M 4/5825* (2013.01); *C01P 2002/60* (2013.01); *C01P 2004/51* (2013.01); *C01P 2006/16* (2013.01); *C01P 2006/40* (2013.01); *H01M 4/131* (2013.01); *H01M 4/136* (2013.01); *H01M 10/0525* (2013.01); *H01M 2004/021* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| | | | | |
|---|---|---|---|---|
| 2010/0119945 | A1 * | 5/2010 | Akagi et al. | 429/231.8 |
| 2010/0178556 | A1 * | 7/2010 | Manev et al. | 429/199 |
| 2010/0233545 | A1 * | 9/2010 | Sano et al. | 429/231.5 |
| 2010/0270496 | A1 * | 10/2010 | Oki et al. | 252/182.1 |

FOREIGN PATENT DOCUMENTS

| | | |
|---|---|---|
| JP | 2001-110414 | 4/2001 |
| JP | 2002-110162 | 4/2002 |

(Continued)

OTHER PUBLICATIONS

A. K. Padhi et al.; Phospho-olivines as Positive-Electrode Materials for Rechargeable Lithium Batteries; J. Electrochem. Soc.; vol. 144, No. 4; Apr. 1997.

*Primary Examiner* — Jonathan Crepeau
(74) *Attorney, Agent, or Firm* — Sheridan Ross P.C.

(57) ABSTRACT

A lithium ion secondary battery includes: a positive electrode; a negative electrode; and an electrolytic solution, at least one of the positive electrode and the negative electrode being capable of storing and releasing lithium ions, and containing an active material that satisfies predetermined conditions.

13 Claims, 5 Drawing Sheets

(56) References Cited

FOREIGN PATENT DOCUMENTS

| | | |
|---|---|---|
| JP | 2003-036889 | 2/2003 |
| JP | 2004-259470 | 9/2004 |
| JP | 2009-152188 | 7/2009 |
| JP | 2009-263222 | 11/2009 |

* cited by examiner

LITHIUM ION SECONDARY BATTERY ACTIVE MATERIAL, LITHIUM ION SECONDARY BATTERY ELECTRODE, LITHIUM ION SECONDARY BATTERY, ELECTRONIC DEVICE, ELECTRONIC POWER TOOL, ELECTRIC VEHICLE, AND POWER STORAGE SYSTEM

FIELD

The present technology relates to lithium ion secondary battery active material capable of storing and releasing lithium ions, electrodes for lithium ion secondary batteries using the active material, lithium ion secondary batteries using the electrodes, electronic devices, electric power tools, electric vehicles, and power storage systems using the secondary batteries.

BACKGROUND

There is a strong demand for smaller, lighter, and longer-life electronic devices such as mobile phones and portable information terminal devices, which have become pervasive over the last years. In this connection, batteries, particularly secondary batteries, that are small and light and capable of providing high energy density have been developed as power supplies. Aside from applications to these electronic devices, the use of the secondary batteries has been investigated in a variety of other areas, including electric power tools such as an electric drill, electric vehicles such as an electric car, and power storage systems such as a home power server.

Among a wide range of secondary batteries that operate under a variety of charge and discharge principles, lithium ion secondary batteries that provide battery capacity by taking advantage of the storage and release of lithium ions are very promising for their ability to provide higher energy density than other batteries such as lead batteries and nickel cadmium batteries.

Lithium ion secondary batteries include a positive electrode, a negative electrode, and an electrolytic solution. The positive electrode and the negative electrode contain active material capable of storing and releasing lithium ions. Typically, Li complex oxides are used as the active material of the positive electrode (positive electrode active material). Typical examples of Li complex oxides include compounds having a laminar rock salt structure (such as $LiCoO_2$), compounds having a spinel structure (such as $LiMn_2O_4$), and compounds having an olivine structure such as $LiFePO_4$. Typical examples of the active material of the negative electrode (negative electrode active material) include carbon materials such as graphite, metallic materials such as Si and Sn, and Li complex oxides such as $Li_4Ti_5O_{12}$. The active materials are appropriately selected according to such factors as the intended use of the lithium ion secondary battery.

These active materials have been studied in a variety of ways with regard to their compositions and configurations, because the types of active material greatly influence battery performance such as battery capacity and cycle characteristics. Specifically, because the storage and release of lithium ions tend to be slower when using a Li complex oxide of an olivine structure as the positive electrode active material than when using a Li complex oxide of a laminar rock salt structure, there has been a number of proposals directed to improving the storage and release of lithium ions.

For example, JP-A-2001-110414 proposes supporting conductive fine particles on the powder surface of lithium iron phosphate material to improve the charge and discharge capacity for the charge and discharge of large current. The lithium iron phosphate material is represented by $Li_zFe_{1-y}X_yPO_4$ (X is Mg or the like, $0 \leq y \leq 0.3$, $0 < z \leq 1$). The conductive fine particles have a higher redox potential than the lithium iron phosphate material.

For example, JP-A-2003-036889 proposes combining lithium transition metal complex oxide particles and carbon substance fine particles to obtain excellent input and output densities independent of the charged state. The lithium transition metal complex oxide is represented by $LiMePO_4$ (Me is one or more divalent transition metals).

For example, JP-A-2002-110162 proposes combining LiFe complex phosphate and carbon material, and providing a specific surface area of 10.3 $m^2/g$ or more for the complex, in order to obtain excellent electrical conductivity. The LiFe complex phosphate is represented by $Li_xFePO_4$ ($0 < x \leq 1$), and the complex primary particle size is 3.1 μm or less.

For example, JP-A-2004-259470 proposes producing a lithium composite metal phosphate having a crystallite size of 35 nm or less to obtain high discharge capacity, using the spray-pyrolysis technique. The lithium composite metal phosphate is represented by $Li_xA_yPO_4$ (A is Fe or the like, $0 < x < 2$, $0 < y \leq 1$).

For example, JP-A-2009-263222 proposes producing lithium iron phosphate particles using a lithium raw material, a phosphorus raw material, and an iron raw material (for example, iron oxide with an average primary particle size of 5 nm to 300 nm), in order to obtain high capacity even under current load conditions. The producing method includes mixing the raw materials, adjusting the agglomerate particle size of the mixture to 0.3 μm to 5 μm, and calcining the agglomerate particles under, for example, a reducing gas atmosphere.

SUMMARY

Improving the lithium ion input-output characteristics of the active material is considered essential for ensuring the battery capacity and cycle characteristics of the lithium ion secondary battery. However, the attempts to improve the lithium ion input-output characteristics in cases of the use of Li complex oxides of an olivine structure as the positive electrode active material cannot be said as being sufficient. This is not only the problem when using the Li complex oxides of an olivine structure as the positive electrode active material, but the problem when using other Li complex oxides having a laminar rock salt structure or a spinel structure, or using the Li complex oxides as the negative electrode active material.

Accordingly, there is a need for a lithium ion secondary battery active material capable of improving the lithium ion input-output characteristics, a lithium ion secondary battery electrode, a lithium ion secondary battery, an electronic device, an electric power tool, an electric vehicle, and a power storage system.

An embodiment of the present technology is directed to an active material for a lithium ion secondary battery capable of storing and releasing lithium ions and satisfying the following conditions (A) to (D): (A) the active material being a Li complex oxide or a Li complex oxoacid salt that contains lithium, oxygen, and at least one of the elements of Groups 2 to 15 of the long-form periodic table; (B) the active material containing a plurality of primary particles having a particle size distribution (median diameter: nm) with 1 nm<D10<65 nm, 5 nm<D50<75 nm, and 50 nm<D90<100 nm; (C) the active material having a plurality of pores between the plurality of primary particles, wherein the maximum peak pore size A (nm) in a pore size distribution as measured by a mercury intrusion technique is 10 nm≤A≤75 nm; and (D) the ratio B/A of the maximum peak pore size A (nm) and the crystallite size B (nm) determined from the half width of an X-ray diffraction pattern as measured by X-ray diffractometry is 0.5<B/A≤1.

Another embodiment of the present technology is directed to an electrode for a lithium ion secondary battery including the lithium ion secondary battery active material of the embodiment of the present technology described above. Still another embodiment of the present technology is also directed to a lithium ion secondary battery including a positive electrode, a negative electrode, and an electrolytic solution, wherein the lithium ion secondary battery electrode of the embodiment of the present technology described above is used as at least one of the positive electrode and the negative electrode. Yet another embodiment of the present technology is directed to an electronic device, an electric power tool, an electric vehicle, or a power storage system using the lithium ion secondary battery of the embodiment of the present technology described above.

In the lithium ion secondary battery active material, the lithium ion secondary battery electrode, and the lithium ion secondary battery of the embodiments of the present technology, the active material capable of storing and releasing lithium ions satisfies the foregoing conditions (A) to (D). In this way, the lithium ion input-output characteristics can be improved. The same effect also can be obtained in the electronic device, the electric power tool, the electric vehicle, and the power storage system using the lithium ion secondary battery of the embodiment of the present technology.

DETAILED DESCRIPTION

The following specifically describes embodiments of the present technology with reference to the accompanying drawings. Descriptions will be given in the following order.
1. Lithium ion secondary battery (active material for lithium ion secondary battery, and electrode for lithium ion secondary battery)
 1-1. Cylindrical secondary battery
 1-2. Laminate film secondary battery
2. Use of lithium ion secondary battery
<1. Lithium Ion Secondary Battery>
<1-1. Cylindrical Secondary Battery>

A lithium ion secondary battery of an embodiment of the present technology is described first. The active material for lithium ion secondary batteries, and the electrode for lithium ion secondary batteries of the embodiment of the present technology are used for the lithium ion secondary battery described below.

Figure 1:
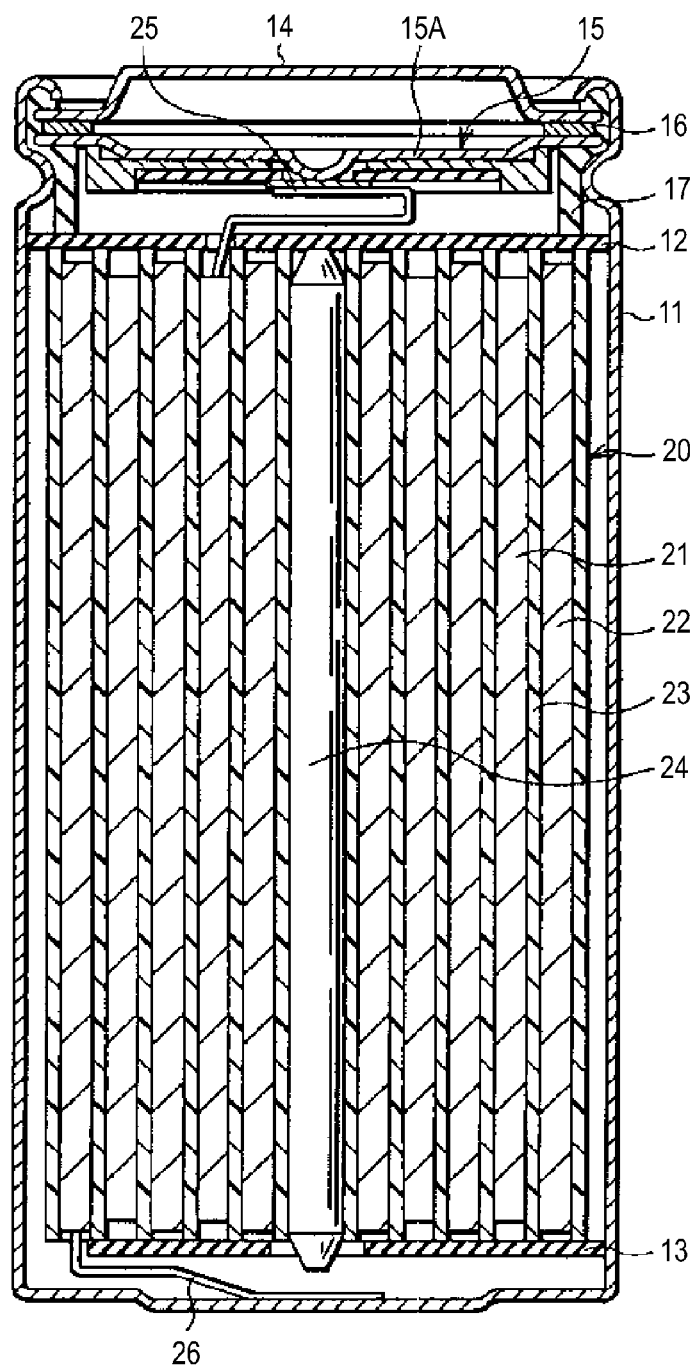
FIG. 1 is a cross sectional view illustrating the configuration of a lithium ion secondary battery (cylindrical secondary battery) using the active material of an embodiment of the present technology.
Figure 2:
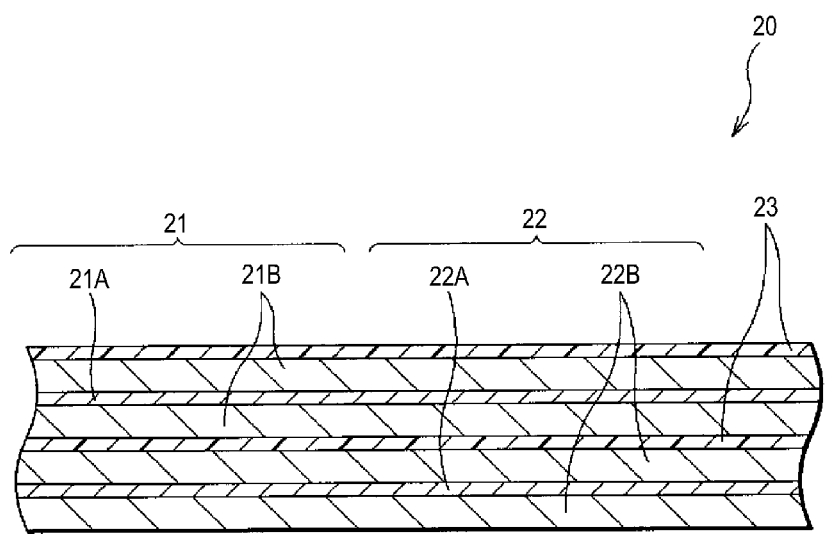
FIG. 2 is across sectional view illustrating a magnified portion of a wound electrode unit shown in FIG. 1.

FIG. 1 and FIG. 2 are cross sectional views illustrating the configuration of the lithium ion secondary battery (hereinafter, simply "secondary battery"). FIG. 2 shows a magnified portion of a wound electrode unit 20 illustrated in FIG. 1.

[Overall Configuration of Secondary Battery]

The secondary battery is what is commonly called a cylindrical secondary battery. The secondary battery includes a substantially hollow cylindrical battery canister 11, the wound electrode unit 20, and a pair of insulating plates 12 and 13. The wound electrode unit 20 and the insulating plates 12 and 13 are housed inside the battery canister 11. The wound electrode unit 20 includes, for example, a positive electrode 21 and a negative electrode 22 laminated and wound around via a separator 23.

The battery canister 11 has a hollow structure with a closed end and an open end, and is formed of, for example, Fe, Al, or alloys thereof. The surface of the battery canister 11 may be plated with metallic material such as Ni. The pair of insulating plates 12 and 13 is disposed so as to sandwich the wound electrode unit 20 from the top and bottom, and to perpendicularly extend with respect to the rolled surface.

A battery lid 14, a safety valve mechanism 15, and a heat-sensitive resistive element (positive temperature coefficient: PTC element) 16 are swaged to the open end of the battery canister 11 via a gasket 17. The swaging seals the battery canister 11. The battery lid 14 is formed using, for example, the same material used for the battery canister 11. The safety valve mechanism 15 and the heat-sensitive resistive element 16 are provided on the inner side of the battery lid 14, and the safety valve mechanism 15 is electrically connected to the battery lid 14 via the heat-sensitive resistive element 16. The safety valve mechanism 15 cuts off the electrical connection between the battery lid 14 and the wound electrode unit 20 by the inversion of a disk plate 15A, when the inner pressure reaches a certain level as a result of, for example, internal shorting or external heat. The heat-sensitive resistive element 16 prevents abnormal heating due to large current. The resistance of the heat-sensitive resistive element 16 increases with increasing temperatures. The gasket 17 is formed using, for example, insulating material, and may be asphalt-coated.

A center pin 24 may be inserted at the center of the wound electrode unit 20. The positive electrode 21 is connected to a positive electrode lead 25 formed of conductive material, for example, such as Al. The negative electrode 22 is connected to a negative electrode lead 26 formed of conductive material, for example, such as Ni. The positive electrode lead 25 is welded to the safety valve mechanism 15, and electrically connected to the battery lid 14. The negative electrode lead 26 is welded to the battery canister 11, and electrically connected thereto.

[Positive Electrode]

The positive electrode 21 is structured to include, for example, a positive electrode active material layer 21B provided on at least one side of a positive electrode collector 21A. The positive electrode collector 21A is formed of conductive material, for example, such as Al, Ni, and stainless steel.

The positive electrode active material layer 21B includes one or more positive electrode active materials capable of storing and releasing lithium ions. Other materials such as a positive electrode binder and a positive electrode conductive agent also may be contained, as required.

The positive electrode active material is an active material for lithium ion secondary batteries of the embodiment of the present technology. The positive electrode 21 containing the positive electrode active material is an electrode for lithium ion secondary batteries of the embodiment of the present technology. The positive electrode active material satisfies the following four conditions (A) to (D) (hereinafter, simply "four conditions").

(A) First Condition

The positive electrode active material is a Li complex oxide or a Li complex oxoacid salt that contains lithium (Li), at least one of the elements (M) in Group 2 to 15 of the periodic table (long form), and oxygen (O) as the constituting elements, because these compounds are electrochemically stable, and excel in storing and releasing lithium ions. The element M is not particularly limited, as long as it is at least one element from Group 2 to 15 of the periodic table (long form).

Specifically, the Li complex oxide has, for example, a laminar rock salt structure or a spinel structure. A Li complex oxide having a laminar rock salt structure is, for example, a compound of the following formula (1), and a Li complex oxide having a spinel structure is, for example, a compound of the following formula (2).

$$Li_aM1O_2 \quad (1)$$

(where M1 is at least one of the elements of Groups 2 to 15 of the long-form periodic table, and a satisfies 0<a≤1.2)

$$Li_bMn_cM2_dO_4 \quad (2)$$

(where M2 is at least one of the elements of Groups 2 to 15 of the long-form periodic table (excluding Mn), and b, c, and d satisfy 0<b≤1, 0<c≤2, 0≤d<2, and c+d=2)

The M1 in equation (1) is not particularly limited, as long as it is at least one element from Groups 2 to 15 of the long-form periodic table. For example, M1 is at least one of Ni, Co, Mn, Cu, Fe, Zn, Y, Ti, Mo, Al, Mg, B, V, Cr, Sn, Ca, Sr, and W. Specific examples of the Li complex oxide having a laminar rock salt structure include $LiNiO_2$, $LiCoO_2$, $LiNi_kCo_lMn_mO_2$ (k+l+m=1), and $LiNi_kCo_lAl_mO_2$ (k+l+m=1). These Li complex oxides may further contain a small amount of at least one of the candidate elements M1 above.

The M2 in equation (2) is not particularly limited, as long as it is at least one element from Groups 2 to 15 of the long-form periodic table. For example, M2 is at least one of Co, Ni, Mg, Al, B, Ti, V, Cr, Fe, Cu, Zn, Mo, Sn, Ca, Sr, and W. Specific examples of the Li complex oxide having a spinel structure include $LiMn_2O_4$. The Li complex oxide of a spinel structure may further contain a small amount of at least one of the candidate elements M2 above.

The Li complex oxoacid salt is, for example, Li complex phosphate or other oxoacid salt. The Li complex phosphate has, for example, an olivine structure or some other structure. The Li complex phosphate having an olivine structure is, for example, a compound of the following formula (3).

$$Li_eM3_fPO_4 \quad (3)$$

(where M3 is at least one of the elements of Groups 2 to 15 of the long-form periodic table, and e and f satisfy 0<e≤1, 0<f≤1)

The M3 in equation (3) is not particularly limited, as long as it is at least one element from Groups 2 to 15 of the long-form periodic table. For example, M3 is at least one of Co, Mn, Fe, Ni, Mg, Al, B, Ti, V, Nb, Cu, Zn, Mo, Ca, Sr, W, and Zr. Specific examples of the Li complex phosphate having an olivine structure include $LiFePO_4$, $LiCoPO_4$, $LiFe_{1-p}M31_pPO_4$, $LiFe_{1-p-q}M31_pM32_qPO_4$, $LiCo_{1-p}M31_pPO_4$, and $LiMn_{1-p}M31_pPO_4$. Note that M31 represents the same elements represented by M3 (excluding the redundant elements), and p and q satisfy 0<p<1, and 0<q<1.

Examples of the Li complex phosphate of some other structure include $Li_2Fe_2PO_4$ and $LiVOPO_4$. These Li complex phosphates may further contain a small amount of at least one of the candidate elements M3 above.

The positive electrode active material is preferably a Li complex oxoacid salt having an olivine structure. The Li complex oxoacid salt having an olivine structure is preferred, because it has lower electrical conductivity than Li complex oxides of a laminar rock salt structure, and can thus provide higher effects.

(B) Second Condition

The positive electrode active material includes a plurality of primary particles. The primary particles have three median diameters D10, D50, and D90 (nm) of the ranges 1 nm<D10<65 nm, 5 nm<D50<75 nm, and 50 nm<D90<100 nm as specified from the particle size distribution of the primary particles. Because the primary particle size is very small and uniform, the ion conduction distance in the primary particles becomes very short in a uniform fashion. This greatly reduces the lithium ion transfer resistance in the primary particles.

Specifically, when D10 and D90 are outside of the foregoing ranges, the primary particle size distribution becomes too wide, and the resistance tends to greatly increase mainly in the late stage of repeated charge and discharge. When D50 is 10 nm or less, the crystallinity of the positive electrode active material lowers. When D50 is 75 nm or more, the lithium ion diffusion distance in the primary particles becomes too long. In either case, the ion conductivity tends to decrease.

The median diameter can be examined by, for example, observing the positive electrode active material (a plurality of primary particles) with a field emission scanning electron microscope (FE-SEM) or the like, and measuring the particle size of each primary particle and the particle size distribution from the observed image. The median diameter (D10, D50, D90) can then be calculated from the measurement result (particle size distribution). In this case, in order to improve the statistical reliability, it is preferable to measure the major axis of each primary particle as the particle size, and to measure the particle size for at least 300 primary particles.

In handing the positive electrode active material of a powder form for the measurement of the median diameter, the primary particles tend to naturally agglomerate (form secondary particles). However, the particle size can still be measured for primary particles forming the secondary particles, because microscopic observation of the positive electrode active material allows the boundaries (contours) of the primary particles to be specified in the secondary particles.

When the positive electrode active material in the positive electrode 21 exists as a mixture with other materials such as a positive electrode binder and a positive electrode conductive agent, the positive electrode active material may be distinguished from the other materials by element mapping using, for example, energy dispersive X-ray spectrometry (EDX). The other materials may be simply removed to separate only the positive electrode active material.

(C) Third Condition

The positive electrode active material has a plurality of pores between the primary particles. The pores are gaps that generate as a result of the primary particles forming the agglomerates (secondary particles). The maximum peak pore size A (nm) as measured from the pore size distribution using the mercury intrusion technique is 10 nm≤A≤75 nm. There is a correlation between the pore size and the particle size of the primary particles. Thus, the lithium ion diffusion distance in the primary particles becomes short when the range of the maximum peak pore size A (10 nm to 75 nm) substantially coincides with the main median diameter range (5 nm<D50<75 nm). Further, the positive electrode active material can easily have high crystallinity in this way.

The pore size distribution may be examined using the mercury intrusion technique, for example, by measuring the amount of mercury intruding the pores in the positive electrode active material using a mercury porosimeter (Shimadzu Corporation; Autopore IV900), and finding the relationship between the intrusion amount of the mercury and the pore size. In the mercury intrusion technique, the mercury intrusion amount V for the pores is measured under gradually increasing pressure P, and the rate of change of the mercury intrusion amount V with respect to pressure P ($\Delta V/\Delta P$) is plotted against the pore size. The intrusion amount of mercury herein is a value obtained by approximating the pressure vs. pore size relationship to "180/pressure=pore size" under the following conditions: mercury surface tension=485 mN/m, mercury contact angle=130°, measurement temperature=19° C. The pore size A corresponding to the peak position (apex) can be specified by specifying a peak (maximum peak) of the maximum intensity from one or more peaks appearing in the mercury porosimeter measurement result (graph).

The number of peaks detected by mercury porosimeter is not particularly limited. However, it is preferable that one or more peaks appear in the pore size range of 10 nm to 150 nm, depending on the range of the median diameter (D10, D50, D90).

As mentioned above, the primary particles of the positive electrode active material tend to naturally form secondary particles during the handling procedure. The pore size distribution can thus be measured by analyzing the secondary particles using a mercury porosimeter.

(D) Fourth Condition

The ratio B/A of the maximum peak pore size A (nm) and the crystallite size B (nm) determined from the half width of the X-ray diffraction pattern of the positive electrode active material as measured by X-ray diffractometry (XRD) is 0.5<B/A≤1. In this way, the positive electrode active material can have high crystallinity, and the lithium ion diffusion rate increases. The ratio B/A represents the number of crystallite domains in the primary particles, and can be used as an index of the crystallinity of the positive electrode active material.

The crystallite size B is found, for example, by first obtaining an X-ray diffraction pattern through the analysis of the positive electrode active material with a X-ray diffractometer (Rigaku Corporation; RINT-2000). Then, four peaks are selected in a descending order of peak intensity from a plurality of peaks detected in the diffraction angle 2θ range of 15° to 45°. The crystallite size can then be calculated from the mean value of the half widths using the Scherrer's equation.

When using the positive electrode active material, it is preferable that the direct current resistivity in the charged state with 80% charge depth be 7.5 kΩ·cm or less. In this way, the constant current state can stays longer in the constant current-constant voltage charging process, and the positive electrode active material can rapidly store and release the lithium ions.

It is particularly preferable that the positive electrode active material have a carbon material-containing coating on at least a part of the primary particle surface. In this way, the resistance of the positive electrode active material lowers, and the electrical conductivity and ion conductivity improve.

The Raman spectrum of the coating measured by Raman spectroscopy can be used as an index of the extent of the carbonization of the coating (electrical conductivity). It is thus preferable that there is an intensity ratio ($I_D/I_G$) of 0.65 or more between the peak obtained in the 1,250 $cm^{-1}$ to 1,350 $cm^{-1}$ range (intensity $I_D$) and the peak obtained in the 1,500 $cm^{-1}$ to 1,700 $cm^{-1}$ range (intensity $I_G$). In this way, the extent of the coating carbonization increases, and excellent electrical conductivity can be obtained. Note that a Raman spectrometer (Renishaw; SYSTEM 2000) is used for the Raman spectrometry. The weight ratio of the coating for the primary particles is not particularly limited, and is preferably 0.01 weight % to 10 weight %. In this way, the resistance of the positive electrode active material can be further lowered while preventing the storage and release of lithium ions from being suppressed.

The coating may be formed by, for example, dispersing an active material powder (a plurality of primary particles) in a solvent with a carbon powder such as Ketjen black, or with an organic material, such as maltose, that can be a carbon source, and spraying the resulting liquid in a high-temperature atmosphere by using a method such as spray drying. The solvent may be an organic solvent or water. Because the organic solvent vaporizes while being sprayed, the primary particle surface is at least partially coated with the carbon material. Here, because the primary particles agglomerate, there are cases where granules (secondary particles) are formed. When obtaining secondary particles using this method, for example, the organic solvent temperature and other granulation conditions may be adjusted to control conditions such as the maximum peak pore size A.

The positive electrode active material layer 21B may include other positive electrode active materials, in addition to the positive electrode active material satisfying the foregoing four conditions. Examples of such other positive electrode materials include oxides, disulfides, chalcogenides, and conductive polymers. Examples of oxides include titanium oxide, vanadium oxide, and manganese dioxide. Examples of disulfides include titanium disulfide and molybdenum sulfide. Examples of chalcogenides include niobium selenide. Examples of conductive polymers include sulfur, polyaniline, and polythiophene.

The positive electrode binder is, for example, one or more synthetic rubbers or polymer materials. Examples of synthetic rubbers include styrene-butadiene rubbers, fluorine rubbers, and ethylene propylene diene. Examples of polymer materials include polyvinylidene fluoride and polyimides.

The positive electrode conductive agent is, for example, one or more carbon materials. Examples of carbon materials include graphite, carbon black, acetylene black, Ketjenblack, and fibrous carbon. The positive electrode conductive agent may be, for example, metallic material or conductive polymer, as long as it has conductivity.

Preferably, the positive electrode conductive agent is fibrous carbon. In this way, because of the fewer contact points in the positive electrode conductive agent, a less amount of the positive electrode binder is needed, and the conductivity mainly along the thickness of the positive electrode active material layer 21B can improve. The average fiber diameter of the fibrous carbon is, for example, 1 nm to 200 nm, preferably 10 nm to 200 nm. The aspect ratio (average fiber length/average fiber diameter) of the fibrous carbon is, for example, 20 to 20,000, preferably 20 to 4,000, more preferably 20 to 2,000.

Further, the positive electrode conductive agent, when used for a positive electrode active material layer 21B of an increased thickness for improved secondary battery volume efficiency, is preferably secondary particles of carbon black. This is because the major axis of the secondary particles of carbon black is longer than the major axis of the fibrous carbon. In this way, as mentioned above, the positive electrode binder can be used in smaller amounts, and the conductivity of the positive electrode active material layer 21B can improve.

[Negative Electrode]

The negative electrode 22 is structured to include, for example, a negative electrode active material layer 22B provided on at least one side of a negative electrode collector 22A.

The negative electrode collector 22A is formed of conductive material, for example, such as Cu, Ni, and stainless steel. Preferably, the surface of the negative electrode collector 22A is roughened. In this way, the adhesion of the negative electrode active material layer 22B for the negative electrode collector 22A can improve by the anchor effect. In this case, the surface of the negative electrode collector 22A may be roughed in at least a region facing the negative electrode active material layer 22B. For example, a method that forms fine particles by electrolysis treatment may be used as the roughing method. The electrolysis treatment is a method by which fine particles are formed on the surface of the negative electrode collector 22A to provide irregularities by electrolysis in an electrolysis vessel. The Cu foil formed by electrolysis is generally called an electrolytic Cu foil.

The negative electrode active material layer 22B includes one or more negative electrode active materials capable of storing and releasing lithium ions. Other materials such as a negative electrode binder and a negative electrode conductive agent also may be contained, as required. Note that details of the negative electrode binder and the negative electrode conductive agent are as described above, for example, in conjunction with the positive electrode binder and the positive electrode conductive agent. In order to prevent, for example, accidental deposition of Li metal during the charge and discharge, it is preferable in the negative electrode active material layer 22B that the negative electrode active material have greater chargeable capacity compared to the discharge capacity of the positive electrode 21.

The negative electrode active material is an active material for lithium ion secondary batteries of the embodiment of the present technology, and the negative electrode 22 containing the negative electrode active material is an electrode for lithium ion secondary batteries of the embodiment of the present technology. The negative electrode active material has the same configuration as the positive electrode active material, and satisfies the four conditions. With regard to the first condition, the negative electrode active material is a compound (Li complex oxide) having, for example, a spinel structure, and represented by the formulae (4) to (6) below. Li complex oxides containing Li and Ti as constituting elements are more electrochemically stable (less reactive) than carbon materials (for example, graphite), and thus suppress the degradation reaction of the electrolytic solution due to the reactivity of the negative electrode 22. The resistance of the negative electrode 22 thus does not easily increase even after the repeated charge and discharge.

$$Li[Li_xM4_{(1-3x)/2}Ti_{(3+x)/2}]O_4 \quad (4)$$

(where M4 is at least one of Mg, Ca, Cu, Zn, and Sr, and x satisfies $0 \leq x \leq 1/3$)

$$Li[Li_yM5_{1-3y}Ti_{1+2y}]O_4 \quad (5)$$

(where M5 is at least one of Al, Sc, Cr, Mn, Fe, Ga, and Y, and y satisfies $0 \leq y \leq 1/3$)

$$Li[Li_{1/3}M6_zTi_{(5/3)-z}]O_4 \quad (6)$$

(where M6 is at least one of V, Zr, and Nb, and z satisfies $0 \leq z \leq 2/3$)

The M4 in equation (4) is a metallic element that can be a divalent ion. The M5 in equation (5) is a metallic element that can be a trivalent ion. The M6 in equation (6) is a metallic element that can be a tetravalent ion. Specific examples of the Li complex oxides of equation (1) include $Li_{3.75}Ti_{4.875}Mg_{0.375}O_{12}$. Specific examples of the LiTi complex oxides of equation (2) include $LiCrTiO_4$. Specific examples of the LiTi complex oxides of equation (3) include $Li_4Ti_5O_{12}$ and $Li_4Ti_{4.95}Nb_{0.05}O_{12}$.

At least part of the surface of the negative electrode active material may be coated with a carbon material-containing coating. In this way, the resistance of the negative electrode active material lowers. The coating may be formed by, for example, decomposing hydrocarbons or the like by using a method such as chemical vapor deposition (CVD), and allowing a carbon coating to grow on the Ti complex oxide surface.

The negative electrode active material layer 22B may also contain other negative electrode active materials, in addition to the negative electrode active materials satisfying the foregoing four conditions. Carbon material is an example of such other negative electrode materials. Carbon materials undergo very little change in the crystalline structure during the storage and release of lithium ions, and can thus provide high energy density and excellent cycle characteristics. Carbon materials also function as a negative electrode conductive agent. Examples of carbon material include an easily graphitizable carbon, a non-graphitizable carbon having a (002) plane distance of 0.37 nm or more, and a graphite having a (002) plane distance of 0.34 nm or less. Specific examples include pyrolyzed carbons, cokes, glass-like carbon fibers, organic polymer compound calcined products, activated carbons, and carbon blacks. Cokes include pitch cokes, needle cokes, and petroleum cokes. The organic polymer compound calcined products refer to products obtained by calcining (carbonizing) polymer compounds such as phenol resin and furan resin at appropriate temperatures. Further, the carbon material may be a low crystalline carbon or an amorphous carbon heat-treated at about 1,000° C. or less. The carbon material may be fibrous, spherical, granular, or scale-like in shape.

Other negative electrode active materials are, for example, (metallic) materials that include one or more metallic elements and semi-metallic elements as constituting elements. In this way, high energy density can be obtained. Note that materials that correspond to the Li complex oxides or the like are excluded. The metallic material may include one or more metallic elements or semi-metallic elements, either alone or as an alloy or a compound, or may at least partially include one or more phases of these. As used herein, the "alloy" encompasses materials formed of two or more metallic elements, and materials formed of one or more metallic elements and one or more semi-metallic elements. Further, the "alloy" may include a non-metallic element. The structure may be a solid solution, a eutectic (eutectic mixture), or an intermetallic compound, or a mixture of two or more of these.

The metallic and semi-metallic elements are, for example, those capable of forming an alloy with lithium. Specific examples include one or more of Mg, B, Al, Ga, In, Si, Ge, Sn, Pb, Bi, Cd, Ag, Zn, Hf, Zr, Y, Pd, and Pt. At least one of Si and Sn is particularly preferred, because these elements excel in storing and releasing lithium ions, and can thus provide high energy density.

Examples of materials that include at least one of Si and Sn include one or more kinds of the elementary substance, alloys and compounds of silicon, one or more kinds of the elementary substance, alloys and compounds of tin, and materials that at least partially include one or more phases of these.

Note that the term "elementary substance" as used herein is intended to have a general meaning (allows for inclusion of trace amounts of impurities), and does not necessarily mean 100% purity.

Examples of the silicon alloy include materials including at least one non-silicon constituting element selected from Sn, Ni, Cu, Fe, Co, Mn, Zn, In, Ag, Ti, Ge, Bi, Sb, and Cr. Examples of the silicon compound include those containing carbon or oxygen as a non-silicon constituting element. For example, one or more of the elements presented in conjunction with the silicon alloy may be contained in the silicon compound as non-silicon constituting elements.

Examples of the silicon alloy or compound include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\le 2$), and LiSiO. Note that v in $SiO_v$ may satisfy $0.2<v<1.4$.

Examples of the tin alloy include materials including at least one non-tin constituting element selected from Si, Ni, Cu, Fe, Co, Mn, Zn, In, Ag, Ti, Ge, Bi, Sb, and Cr. Examples of the tin compound include materials that contain C or O as a constituting element. For example, one or more of the elements presented in conjunction with the tin alloy may be contained in the tin compound as non-tin constituting elements. Examples of the tin alloy or compound include $SnO_w$ ($0<w\le 2$), $SnSiO_3$, LiSnO, and $Mg_2Sn$.

Examples of the Sn-containing material include materials that contain second and third constituting elements in addition to the first constituting element tin. Examples of the second constituting element include one or more elements selected from Co, Fe, Mg, Ti, V, Cr, Mn, Ni, Cu, Zn, Ga, Zr, Nb, Mo, Ag, In, Ce, Hf, Ta, W, Bi, and Si. Examples of the third constituting element include one or more of B, C, Al, and P. Inclusion of the second and third constituting elements improves battery characteristics, including battery capacity and cycle characteristics.

Materials containing Sn, Co, and C (SnCoC-containing materials) are preferred. The composition of the SnCoC-containing material is, for example, 9.9 mass % to 29.7 mass % carbon, and 20 mass % to 70 mass % Co/(Sn+Co). High energy density can be obtained with these composition ranges.

It is preferable that the SnCoC-containing material include a Sn-, Co-, and C-containing phase, and that this phase is low-crystalline or amorphous. This phase is a reaction phase reactive to lithium, and the presence of this reaction phase provides excellent characteristics. The half width of the diffraction peak obtained by the X-ray diffraction analysis of the phase is preferably 1.0° or more in terms of a diffraction angle 2θ, as measured with CuKα rays used as specific X-rays and at a sweep rate of 1°/min. In this way, the lithium ions are more smoothly stored and released, and the reactivity for the electrolytic solution weakens. Note that the SnCoC-containing material may also include the whole or partial phase of each constituting element, in addition to the low crystalline or amorphous phase.

Whether the diffraction peak obtained by X-ray diffraction corresponds to the reaction phase reactive to lithium can easily be determined by comparing the X-ray diffraction charts before and after the electrochemical reaction with lithium. For example, the diffraction peak corresponds to the reaction phase reactive to lithium when there is a change in the diffraction peak position before and after the electrochemical reaction with lithium. In this case, for example, the diffraction peak of the low crystalline or amorphous reaction phase occurs at 2θ of 20° to 50°. It is considered that such a reaction phase includes, for example, the foregoing constituting elements, and mainly exists as a low crystalline or amorphous phase by the presence of carbon.

In the SnCoC-containing material, it is preferable that the constituting element carbon at least partially bind to the other constituting elements, namely, the metallic elements or semi-metallic elements. Bonding of the carbon with other elements suppresses agglomeration or crystallization of tin or other elements. The state of element binding can be measured by, for example, X-ray photoelectron spectroscopy (XPS). Commercially available devices use, for example, Al—Kα rays or Mg—Kα rays as soft X-rays. When the carbon is at least partially binding to the metallic elements or semi-metallic elements, the peak of the carbon is orbital (C1s) synthetic wave occurs in a region below 284.5 eV. Here, the device is calibrated so that a peak of the gold atom 4f orbital (Au4f) occurs at 84.0 eV. Further, because the surface of a substance is typically contaminated with carbon, the C1s peak of such surface-contaminating carbon at 284.8 eV is taken as the reference energy. In XPS measurement, because the waveform of the C1s peak is obtained as the waveform that includes the peak of the surface-contaminating carbon and the peak of the carbon contained in the SnCoC-containing material, these peaks are analyzed and separated by using, for example, commercially available software. In the waveform analysis, the position of the main peak on the lowest binding energy side is used as the reference energy (284.8 eV).

The SnCoC-containing material may further contain other constituting elements, as required. Examples of such other constituting elements include one or more of Si, Fe, Ni, Cr, In, Nb, Ge, Ti, Mo, Al, P, Ga, and Bi.

Aside from the SnCoC-containing material, materials containing Sn, Co, Fe, and C (SnCoFeC-containing materials) are also preferred. The SnCoFeC-containing materials may have any compositions. For example, a composition with a low Fe content is 9.9 mass % to 29.7 mass % carbon, 0.3 mass % to 5.9 mass % iron, and 30 mass % to 70 mass % (Co/(Sn+Co). Further, for example, a composition with a high Fe content is 11.9 mass % to 29.7 mass % carbon, 26.4 mass % to 48.5 mass % (Co+Fe)/(Sn+Co+Fe), and 9.9 mass % to 79.5 mass % (Co/(Co+Fe). High energy density can be obtained with these composition ranges. The SnCoFeC-containing material has the same physical properties (including half width) as the SnCoC-containing material.

Other negative electrode active materials may be, for example, metal oxides or polymer compounds. Examples of metal oxides include iron oxide, ruthenium oxide, and molybdenum oxide. Examples of polymer compounds include polyacetylene, polyaniline, and polypyrrole.

The negative electrode active material layer 22B is formed using, for example, any of a coating method, a vapor-phase method, a liquid-phase method, a spray method, and a calcining method (sinter method), either individually or in combinations of two or more. The coating method is a method whereby, for example, a powdery negative electrode active material is mixed with a binder and the like, and dispersed in an organic solvent or the like for coating. The vapor-phase method may be, for example, a physical deposition method or a chemical deposition method, specifically, a vacuum deposition method, a sputter method, an ion plating method, a laser abrasion method, a thermal chemical vapor deposition, a chemical vapor deposition (CVD) method, or a plasma chemical vapor deposition method. The liquid-phase method may be, for example, an electrolytic plating method, or a non-electrolytic plating method. The spray method is a method by which the negative electrode active material is sprayed in the molten state or semi-molten state. The calcining method is, for example, a method involving a heat treatment at a temperature higher than the melting point of the binder or the like after the coating is formed by the same procedure used in the coating method. Known techniques may be used for the calcining method. Examples include an atmospheric calcining method, a reactive calcining method, and a hot-press calcining method.

In the lithium ion secondary battery, as described above, the negative electrode material capable of storing and releasing lithium ions has a greater electrochemical equivalent than the positive electrode, in order to prevent accidental deposition of the lithium metal on the negative electrode 22 during the charging process. Further, because the amount of released lithium ions per unit mass increases when the fully charged open circuit voltage (i.e., battery voltage) is 4.25 V or more than when 4.20 V even with the same positive electrode active material, the amounts of the positive electrode active material and the negative electrode active material are adjusted taking this into account. In this way, high energy density can be obtained.

Even though the positive electrode 21 and the negative electrode 22 have been described as containing active material that satisfies the foregoing four conditions, only one of the positive electrode 21 and the negative electrode 22 may contain such active material.

[Separator]

The separator 23 is provided to isolate the positive electrode 21 and the negative electrode 22 from each other, and allows for passage of lithium ions while preventing current shorting caused by contacting of the electrodes. The separator 23 is configured using, for example, a porous film of synthetic resin or ceramic. The separator 23 may be a laminate of two or more of such porous films. Examples of the synthetic resin include polytetrafluoroethylene, polypropylene, and polyethylene.

[Electrolytic Solution]

The separator 23 is impregnated with a liquid electrolyte, electrolytic solution. The electrolytic solution is a solution of an electrolyte salt dissolved in a solvent, and may contain other materials such as additives, as required.

The solvent includes one or more nonaqueous solvents such as organic solvents. Examples include ethylene carbonate, propylene carbonate, butylene carbonate, dimethyl carbonate, diethyl carbonate, ethyl methyl carbonate, methyl propyl carbonate, γ-butyrolactone, γ-valerolactone, 1,2-dimethoxyethane, and tetrahydrofuran. Other examples include 2-methyltetrahydrofuran, tetrahydropyran, 1,3-dioxolan, 4-methyl-1,3-dioxolan, 1,3-dioxane, and 1,4-dioxane. Yet other examples include methyl acetate, ethyl acetate, methyl propionate, ethyl propionate, methyl butyrate, methyl isobutyrate, methyl trimethylacetate, and ethyl trimethylacetate. Still other examples include acetonitrile, glutaronitrile, adiponitrile, methoxyacetonitrile, 3-methoxypropionitrile, N,N-dimethylformamide, N-methylpyrrolidinone, and N-methyloxazolidinone. Yet other examples include N,N'-dimethyl imidazolidinone, nitromethane, nitroethane, sulfolane, trimethyl phosphate, and dimethyl sulfoxide. Use of these solvents improves battery characteristics, including battery capacity, cycle characteristics, and storage characteristics.

At least one of ethylene carbonate, propylene carbonate, dimethyl carbonate, diethyl carbonate, and ethyl methyl carbonate are particularly preferred, because these provide superior characteristics. In this case, it is preferable to use a high-viscosity (high-dielectric) solvent (for example, relative permittivity $\varepsilon \geq 30$), for example, such as ethylene carbonate and propylene carbonate, as a mixture with a low-viscosity solvent (for example, viscosity $1 \leq mPa \cdot s$), for example, such as dimethyl carbonate, ethyl methyl carbonate, and diethyl carbonate. The use of such mixtures improves the dissociation of the electrolyte salt and ion mobility.

It is particularly preferable that the solvent contain an unsaturated carbon bond cyclic carbonate ester. In this way, a stable protective film forms on the surface of the negative electrode 22 during the charge and discharge, and suppresses the degradation reaction of the electrolytic solution. The unsaturated carbon bond cyclic carbonate ester is a cyclic carbonate ester having one or more unsaturated carbon bonds. Examples include vinylene carbonate and vinyl ethylene carbonate. The content of the unsaturated carbon bond cyclic carbonate ester in the solvent is not particularly limited, and is, for example, 0.01 weight to 10 weight %. In this way, the degradation reaction of the electrolytic solution can be suppressed without excessively lowering battery capacity.

It is preferable that the solvent contain at least one of a halogenated chain carbonate ester and a halogenated cyclic carbonate ester. In this way, a stable protective film forms on the surface of the negative electrode 22 during the charge and discharge, and suppresses the degradation reaction of the electrolytic solution. The halogenated chain carbonate ester is a chain carbonate ester having one or more halogen groups. The halogenated cyclic carbonate ester is a cyclic carbonate ester having one or more halogen groups. The halogen groups are not particularly limited, and are preferably fluorine group, chlorine group, or bromine group, of which the fluorine group is more preferred. In this way, high effects can be obtained. The number of halogen groups is preferably two, rather than one, and may be three or more. In this way, a stronger and more stable protective film forms, and suppresses the degradation reaction of the electrolytic solution more effectively. Examples of the halogenated chain carbonate ester include fluoromethyl methyl carbonate, bis(fluoromethyl)carbonate, and difluoromethyl methyl carbonate. Examples of the halogenated cyclic carbonate ester include 4-fluoro-1,3-dioxolan-2-one, and 4,5-difluoro-1,3-dioxolan-2-one. The contents of the halogenated chain carbonate ester and halogenated cyclic carbonate ester in the solvent are not particularly limited, and are, for example, 0.01 weight to 50 weight %. In this way, the degradation reaction of the electrolytic solution can be suppressed without lowering battery capacity.

The solvent may also contain sultone (cyclic sulfonic acid ester). This improves the chemical stability of the electrolytic solution. Examples of sultone include propane sultone, and propene sultone. The sultone content in the solvent is not particularly limited, and is, for example, 0.5 weight % to 5 weight %. In this way, the degradation reaction of the electrolytic solution can be suppressed without excessively lowering battery capacity.

The solvent may further contain acid anhydrides. This improves the chemical stability of the electrolytic solution. Examples of acid anhydrides include dicarboxylic acid anhydrides, disulfonic acid anhydrides, and carboxylic acid sulfonic acid anhydrides. Examples of dicarboxylic acid anhydrides include succinic acid anhydride, glutaric acid anhydride, and maleic acid anhydride. Examples of disulfonic acid anhydrides include ethanedisulfonic acid anhydride, and propanedisulfonic acid anhydride. Examples of carboxylic acid sulfonic acid anhydrides include sulfobenzoic acid anhydride, sulfopropionic acid anhydride, and sulfobutyric acid anhydride. The acid anhydride content in the solvent is not particularly limited, and is, for example, 0.5 weight % to 5 weight %. In this way, the degradation reaction of the electrolytic solution can be suppressed without excessively lowering battery capacity.

[Electrolyte Salt]

The electrolyte salt includes, for example, one or more lithium salts, as follows. The electrolyte salts may be salts other than lithium salts (for example, light metal salts other than lithium salts).

The lithium salts may be, for example, compounds such as $LiPF_6$, $LiBF_4$, $LiClO_4$, $LiAsF_6$, $LiB(C_6H_5)_4$, $LiCH_3SO_3$, $LiCF_3SO_3$, $LiAlCl_4$, $Li_2SiF_6$, $LiCl$, and $LiBr$. These compounds can improve battery characteristics, including battery capacity, cycle characteristics, and storage characteristics. At least one of $LiPF_6$, $LiBF_4$, $LiClO_4$, and $LiAsF_6$ is preferred, and $LiPF_6$ is particularly preferred, because these lowers the internal resistance and provide higher effects.

The electrolyte salt content is preferably from 0.3 mol/kg to 3.0 mol/kg with respect to the solvent, because it provides high ion conductivity.

[Operation of Secondary Battery]

In the secondary battery, for example, the lithium ions released from the positive electrode 21 while charging are stored in the negative electrode 22 via the electrolytic solution. During the discharge, for example, the lithium ions released from the negative electrode 22 are stored in the positive electrode 21 via the electrolytic solution.

[Secondary Battery Producing Method]

The secondary battery is produced, for example, according to the following procedures.

The positive electrode 21 is fabricated by first mixing the positive electrode active material satisfying the foregoing four conditions with optional materials such as a positive electrode binder and a positive electrode conductive agent to provide a positive electrode mixture. The positive electrode mixture is then dispersed in an organic solvent or the like to obtain a paste-like positive electrode mixture slurry. The positive electrode mixture slurry is applied on the both sides of the positive electrode collector 21A, and dried to form the positive electrode active material layer 21B. Finally, the electrode active material layer 21B is compression-molded with a roller press machine or the like while being heated, as required. The compression molding may be repeated more than once.

The negative electrode 22 is fabricated using the same procedure used for the positive electrode 21. Specifically, the negative electrode active material satisfying the foregoing four conditions is mixed with optional materials such as a negative electrode binder and a negative electrode conductive agent to provide a negative electrode mixture, which is then dispersed in an organic solvent or the like to obtain a paste-like negative electrode mixture slurry. The negative electrode mixture slurry is then applied to the both sides of the negative electrode collector 22A, and dried to form the negative electrode active material layer 22B. The negative electrode active material layer 22B is then compression-molded, as required.

The secondary battery is assembled by first attaching the positive electrode lead 25 to the positive electrode collector 21A, and the negative electrode lead 26 to the negative electrode collector 22A, by using a method such as welding. The positive electrode 21 and the negative electrode 22 are then laminated with the separator 23 interposed in between and wound together to fabricate the wound electrode unit 20. The center pin 24 is inserted at the center of the wound electrode unit 20. Thereafter, the wound electrode unit 20 which is interposed between the insulating plates 12 and 13 is housed inside the battery canister 11. Here, the positive electrode lead 25 and the negative electrode lead 26 are attached to the safety valve mechanism 15 and the battery canister 11, respectively, at the leading ends, using a method such as welding. Then, the electrolytic solution is injected into the battery canister 11 to impregnate the separator 23 with the electrolytic solution.

Finally, the battery lid 14, the safety valve mechanism 15, and the heat-sensitive resistive element 16 are swaged to the open end of the battery canister 11 via the gasket 17.

Note that the secondary battery completed this way may be disassembled to take out the positive electrode 21 (positive electrode active material layer 21B) and the negative electrode 22 (negative electrode active material layer 22B) for observation and measurement with a microscope. In this way, the four conditions, particularly the particle size distribution of the primary particles, and the pore size distribution can be measured post fabrication. This is possible because the original particle size of the primary particles, and the state of the secondary particles are maintained even after the completion of the secondary battery. In this case, materials such as the positive electrode binder may be dissolved and removed using an organic solvent or the like, or the unnecessary solvent components (the electrolytic solution, etc.) may be vaporized by heating, as required. The particle size distribution and the pore size distribution are maintained even after the secondary battery is used (charged and discharged), because these characteristics are hardly affected by the charge and discharge.

[Advantages of Secondary Battery]

The positive electrode active material of the positive electrode 21, and the negative electrode active material of the negative electrode 22 of the cylindrical secondary battery satisfy the foregoing four conditions (A) to (D). This makes the diameter of the primary particles uniform and small, and thus reduces the diffusion distance of the lithium ions in the primary particles. Further, because of high crystallinity, the diffusion rate of the lithium ions in the primary particles increases. This suppresses the overvoltage at the late stage of charging or discharge, and improves the input-output characteristics of lithium ions. This makes it possible to suppress the accidental deposition of the lithium metal as might occur, for example, in the process of high-speed charging or low-temperature charging.

Higher effects can be obtained with the carbon material-containing coating formed on at least a part of the primary particle surface, because such a coating improves the electrical conductivity and ion conductivity. Here, even higher effects can be obtained when the intensity ratio $I_D/I_G$ of the peaks measured by Raman spectroscopy is 0.65 or more, because it improves the extent of carbonization. Effects can be even more improved when the weight ratio of the coating with respect to the primary particles is from 0.01 weight % to 10 weight %.

Note that the positive electrode 21 and the negative electrode 22 were described as containing the active materials (positive electrode active material and negative electrode active material, respectively) satisfying the foregoing four conditions. However, only one of the positive electrode 21 and the negative electrode 22 may contain the active material satisfying the four conditions. The same effect can be obtained in this case.

<1-2. Laminate Film Secondary Battery>

Figure 3:
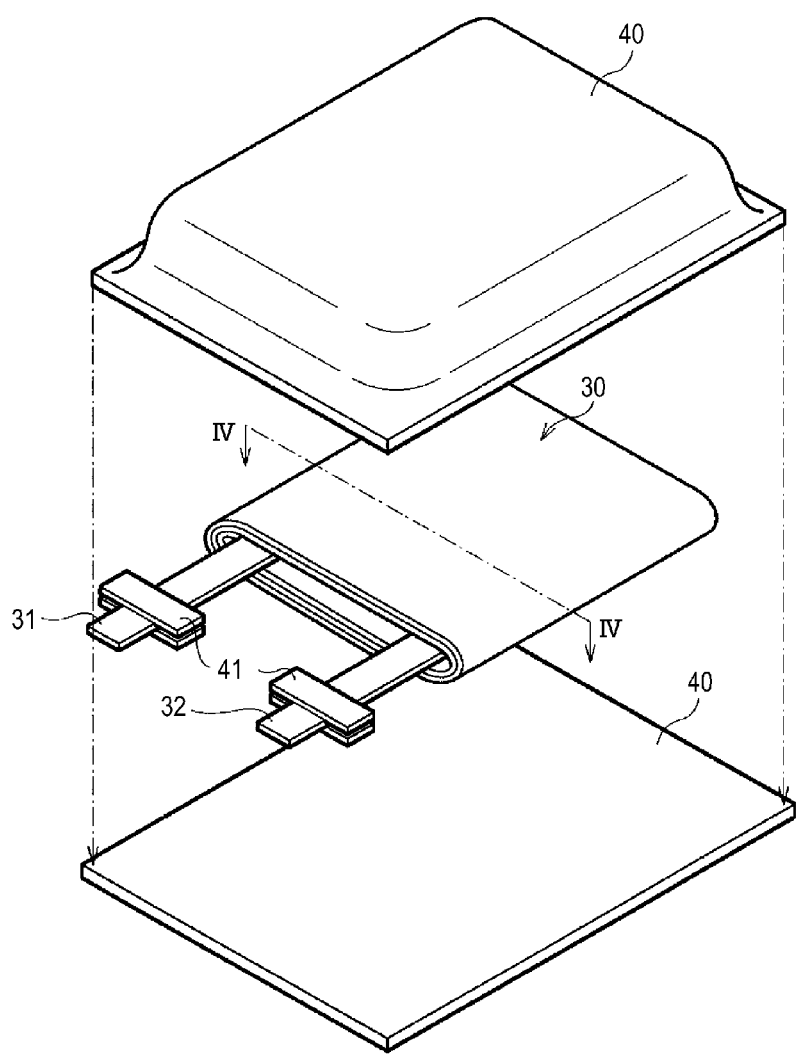
FIG. 3 is a perspective view illustrating the configuration of another lithium ion secondary battery (laminate film secondary battery) using the active material of the embodiment of the present technology.
Figure 4:
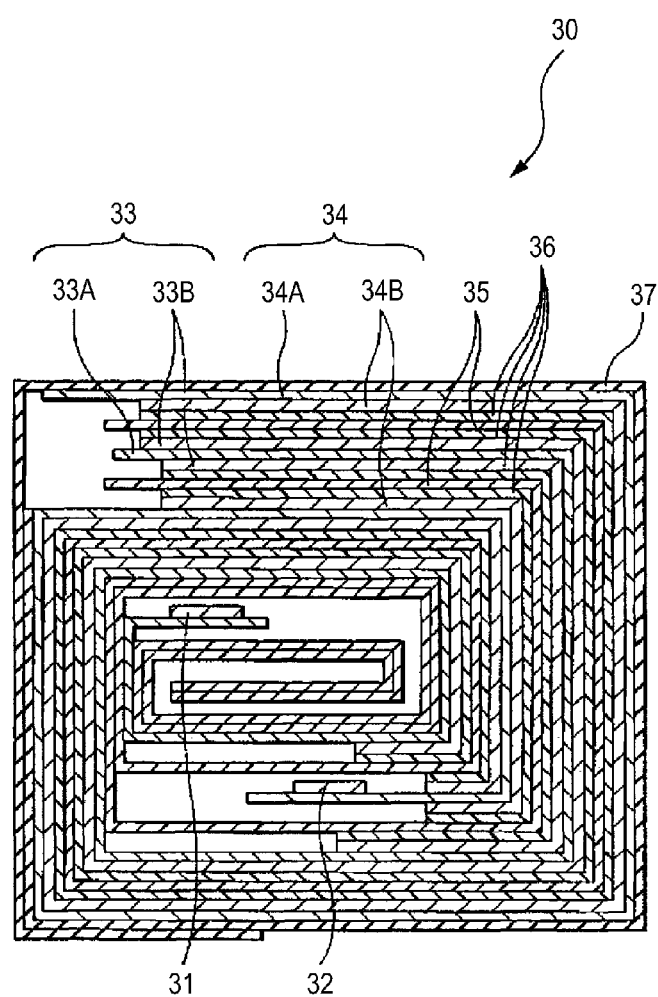
FIG. 4 is a cross sectional view of a wound electrode unit shown in FIG. 3, taken at the line IV-IV.

FIG. 3 is an exploded perspective view of another lithium ion secondary battery according to the embodiment of the present technology. FIG. 4 is a magnified cross sectional view of a wound electrode unit 30 illustrated in FIG. 3, taken along the line IV-IV. In the following, the constituting elements of the cylindrical lithium ion secondary battery described above will be referred to as needed.

[Overall Configuration of Secondary Battery]

The secondary battery described here is so-called a laminate film secondary battery. The secondary battery includes the wound electrode unit 30 housed in a film-like exterior member 40. The wound electrode unit 30 includes a positive electrode 33 and a negative electrode 34 laminated with a separator 35 and an electrolyte layer 36 interposed in between and wound together. A positive electrode lead 31 and a negative electrode lead 32 are attached to the positive electrode 33 and the negative electrode 34, respectively. The outermost periphery of the wound electrode unit 30 is protected by a protective tape 37.

For example, the positive electrode lead 31 and the negative electrode lead 32 lead out in the same direction out of the exterior member 40. The positive electrode lead 31 is formed using, for example, conductive material such as aluminum. The negative electrode lead 32 is formed using, for example, conductive material such as copper, nickel, and stainless steel. These materials are formed into, for example, a thin plate or a mesh.

The exterior member 40 is, for example, a laminate film that includes a fuse layer, a metal layer, and a surface protective layer laminated in this order. For example, two laminate films are bonded to each other by being fused or with an adhesive or the like at the peripheries of the opposing fuse layers of the laminate films so that the fuse layers face the wound electrode unit 30. The fuse layer is, for example, a polyethylene film or a polypropylene film. The metal layer is, for example, an aluminum foil. The surface protective layer is, for example, a nylon film or a polyethylene terephthalate film.

The exterior member 40 is preferably an aluminum laminate film that includes a polyethylene film, an aluminum foil, and a nylon film laminated in this order. However, the exterior member 40 may be a laminate film of some other laminate structure, a polymer film of polypropylene or the like, or a metal film.

An adhesive film 41 for preventing entry of ambient air is inserted between the exterior member 40 and the positive and negative electrode leads 31 and 32. The adhesive film 41 is formed of material adherent to the positive and negative electrode leads 31 and 32. Examples of such material include polyolefin resins such as polyethylene, polypropylene, modified-polyethylene, and modified-polypropylene.

The positive electrode 33 includes a positive electrode active material layer 33B provided, for example, on the both sides of a positive electrode collector 33A. The negative electrode 34 includes a negative electrode active material layer 34B provided, for example, on the both sides of a negative electrode collector 34A. The positive electrode collector 33A, positive electrode active material layer 33B, the negative electrode collector 34A, and the negative electrode active material layer 34B are configured in the same way as the positive electrode collector 21A, the positive electrode active material layer 21B, the negative electrode collector 22A, and the negative electrode active material layer 22B. Accordingly, the positive electrode 33 and the negative electrode 34 include a positive electrode active material and a negative electrode active material, respectively, satisfying the foregoing four conditions. The separator 35 is configured in the same way as the separator 23.

The electrolyte layer 36 contains a polymer compound holding an electrolytic solution. Other materials such as additives also may be contained, as required. The electrolyte layer 36 is so-called a gel electrolyte. In this way, high ion conductivity (for example, 1 mS/cm or more at room temperature) can be obtained, and the electrolytic solution can be prevented from leaking.

Examples of the polymer compound include one or more of the polymer materials selected from polyacrylonitrile, polyvinylidene fluoride, polytetrafluoroethylene, poly-hexafluoropropylene, polyethylene oxide, polypropylene oxide, polyphosphazene, polysiloxane, and polyvinyl fluoride. Other examples include polyvinyl acetate, polyvinyl alcohol, polymethylmethacrylate, polyacrylic acid, polymethacrylic acid, styrene-butadiene rubber, nitrile-butadiene rubber, polystyrene, polycarbonate, and a copolymer of vinylidene fluoride and hexafluoropyrene. Of these, polyvinylidene fluoride, and a copolymer of vinylidene fluoride and hexafluoropyrene are preferred, and polyvinylidene fluoride is more preferred, because these are electrochemically stable.

The composition of the electrolytic solution is the same as that for the cylindrical secondary battery. However, in the electrolyte layer 36 as the gel electrolyte, the nonaqueous solvent of the electrolytic solution is inclusive of not only liquid solvents, but a wide range of ion conductive materials that can dissociate an electrolyte salt. Thus, a polymer compound having ion conductivity is also within the definition of the solvent.

Note that the electrolytic solution may directly be used instead of the gel electrolyte layer 36. In this case, the separator 35 is impregnated with the electrolytic solution.

[Operation of Secondary Battery]

In the secondary battery, for example, the lithium ions released from the positive electrode 33 is stored in the negative electrode 34 via the electrolyte layer 36 while charging. During the discharge, for example, the lithium ions released from the negative electrode 34 is stored in the positive electrode 33 via the electrolyte layer 36.

[Secondary Battery Producing Method]

The secondary battery including the gel electrolyte layer 36 is produced by, for example, the following three procedures.

In a first procedure, the positive electrode 33 and the negative electrode 34 are fabricated using the same procedure used for the positive electrode 21 and the negative electrode 22. The positive electrode 33 is fabricated by forming the positive electrode active material layer 33B on the both sides of the positive electrode collector 33A. The negative electrode 34 is fabricated by forming the negative electrode active material layer 34B on the both sides of the negative electrode collector 34A. In this case, active materials satisfying the foregoing four conditions are used as the positive electrode active material and the negative electrode active material, as required. Thereafter, a precursor solution containing an electrolytic solution, a polymer compound, and a solvent such as an organic solvent is prepared, and applied to the positive electrode 33 and the negative electrode 34 to form the gel electrolyte layer 36. The positive electrode lead 31 and the negative electrode lead 32 are then attached to the positive electrode collector 33A and the negative electrode collector 34A, respectively, by using a method such as welding. The positive electrode 33 and the negative electrode 34 with the electrolyte layer 36 are then laminated with the separator 35 interposed in between and wound together to fabricate the wound electrode unit 30, and the protective tape 37 is attached to the outermost periphery. The wound electrode unit 30 is sandwiched between a pair of film-like exterior members 40, and the outer peripheries of the exterior members 40 are bonded by a method such as a heat fuse method to seal the wound electrode unit 30. In this case, the adhesive film 41 is inserted between the positive and negative electrode leads 31 and 32 and the exterior member 40.

In a second procedure, the positive electrode lead 31 and the negative electrode lead 32 are attached to the positive electrode 33 and the negative electrode 34, respectively. The positive electrode 33 and the negative electrode 34 are then laminated with the separator 35 interposed in between and wound together to fabricate a wound unit as a precursor of the wound electrode unit 30. The protective tape 37 is attached to the outermost peripheries of the wound unit. The wound unit is then sandwiched between a pair of film-like exterior members 40, and the all outer peripheries except for one side are bonded by using a method such as a heat fuse method to house the wound unit inside a bag of the exterior members 40. Then, an electrolyte composition is prepared that contains an electrolytic solution, the raw material monomer of a polymer compound, a polymerization initiator, and optional materials such as a polymerization inhibitor, and injected into the bag of the exterior members 40. The exterior member 40 is then sealed by using a method such as a heat fuse method, and the monomer is heat polymerized. This forms the polymer compound, and completes the gel electrolyte layer 36.

In a third procedure, a wound unit is fabricated and housed in a bag of the exterior members 40 in the same manner as in the second procedure, except for using a separator 35 coated with a polymer compound on the both sides. Examples of the polymer compound applied to the separator 35 include polymers that contain a vinylidene fluoride component (including a homopolymer, a copolymer, and a multicomponent copolymer). Specific examples include binary copolymers containing polyvinylidene fluoride, vinylidene fluoride, and hexafluoropropylene components, and ternary copolymers containing vinylidene fluoride, hexafluoropropylene, and chlorotrifluoroethylene components. A polymer containing a vinylidene fluoride component may be used with one or more other polymer compounds. Thereafter, an electrolytic solution is prepared, and injected into the exterior member 40. The opening of the exterior member 40 is then sealed by using a method such as a heat fuse method. The exterior member 40 is then heated under applied load to bring the separator 35 into contact with the positive electrode 33 and the negative electrode 34 via the polymer compound. As a result, the polymer compound is impregnated with the electrolytic solution, and gelates to form the electrolyte layer 36.

The swelling of the secondary battery is suppressed more in the third procedure than in the first procedure. Further, in the third procedure, the raw material monomer of the polymer compound, the solvent, and other materials hardly remain in the electrolyte layer 36 as compared with the second procedure, and thus formation of the polymer compound can be desirably controlled. Thus, sufficient adhesion can be provided between the electrolyte layer 36 and the positive and negative electrodes 33 and 34 and the separator 35.

[Advantages of Secondary Battery]

The positive electrode active material of the positive electrode 33, and the negative electrode active material of the negative electrode 34 of the laminate film secondary battery satisfy the foregoing four conditions. The input-output characteristics of the lithium ions can thus be improved for the same reason described for the cylindrical secondary battery. Other advantages are as described for the cylindrical secondary battery.

<2. Use of Lithium Ion Secondary Battery>

Application examples of the lithium ion secondary batteries are described below.

Use of the secondary batteries is not particularly limited, as long as the secondary batteries are used for machines, devices, equipment, apparatuses, and systems (an assembly of more than one device) that can use the secondary batteries as driving power supplies, or power storage sources for power accumulation. For use as a power supply, the secondary battery may be a main power supply (a power supply with a priority), or an auxiliary power supply (a power supply used as a replacement for the main power supply, or a power supply switched from the main power supply). In the latter, the main power supply is not limited to a secondary battery.

For example, the secondary batteries may be used in electronic devices such as video cameras, digital still cameras, mobile phones, laptop personal computers, cordless telephones, stereophones, portable radios, portable televisions, and portable information terminals (PDA: personal digital assistant). Examples of the electronic devices include everyday electrical appliances such as an electric shaver; storage devices such as a backup power supply and a memory card; and medical electronic devices such as a pacemaker and a hearing aid. Other examples include electric power tools such as an electric drill and an electric saw. Yet other examples include electric vehicles such as electric automobiles (including hybrid cars). Still other examples include power storage systems such as a home battery system that accumulates power in case of emergency.

The secondary batteries are particularly effective for, for example, electronic devices, electric power tools, electric vehicles, and power storage systems. Because these applications require excellent characteristics for the secondary battery, use of the secondary battery of the embodiment of the present technology can effectively improve battery characteristics. Note that the electronic device is one that executes various functions (for example, playing music) using the secondary battery as the power supply of operation. The electric power tool is one that moves the moving part (for example, a drill), using the secondary battery as the driving power supply. The electric vehicle is one that runs on the secondary battery as the driving power supply, and may be an automobile (including hybrid cars) equipped with other driving sources in addition to the secondary battery. The power storage system is one that uses the secondary battery as the power storage source. For example, in the home power storage system, power is accumulated in the secondary battery used as the power storage source, and the power stored in the secondary battery is consumed as needed to enable use of various types of devices such as a home electric product.

EXAMPLES

Specific examples of the present technology are described below in detail.

Experiment Examples 1 to 12

Li complex phosphates of an olivine structure were obtained as the positive electrode active material according to the following procedure.

First, powders of lithium phosphate ($Li_3PO_4$), manganese (II) phosphate trihydrate ($MnHPO_4 \cdot 3H_2O$), and iron(III) phosphate octahydrate ($FePO_4 \cdot 8H_2O$) were weighed and mixed in a total weight of 600 g. The mixture was then charged into deionized water 4 $dm^3$ (=L), and stirred to obtain a slurry. Here, the amount of each powder was adjusted so as to mix Li, Mn, Fe, and P in the molar ratios presented in Table 1. The slurry was thoroughly stirred after adding 100 g of maltose. Then, the slurry was wet pulverized in the vessel of a bead mill, specifically a wet pulverizer-disperser (Ashizawa Finetech Ltd.; DMR/S110). Here, $ZrO_2$ beads were used that had one or more bead sizes (mm) as presented in Table 1, and the mill was run at the rim speed of 12 m/sec for 120 min. The resulting pulverized slurry was dry granulated by spray drying at an intake air temperature of 200° C. to obtain a precursor powder. Finally, the precursor powder was calcined under 1000 $N_2$ atmosphere at the temperatures (° C.) and for the durations (min) presented in Table 1 to obtain Li complex phosphates of an olivine structure as primary particles.

A series of parameters for the positive electrode active material are presented in Table 2.

For the measurement of median diameter (D10, D50, D90: nm), the positive electrode active material was observed with a FE-SEM (Hitachi; S4300), and the particle sizes (major axis) of 300 primary particles were measured from the observed image. Each median diameter was then determined from the measurement result (particle size distribution).

The intrusion amount of mercury for the pores was measured with a mercury porosimeter (Shimadzu Corporation; Autopore IV900) to examine the maximum peak pore size A (nm) in the pore size distribution, using the mercury intrusion technique. The pore size A at the maximum peak position was then specified from the measurement result (pore size distribution). Crystallite size B (nm) was examined from the X-ray diffraction pattern obtained by analyzing the positive electrode active material with an X-ray diffractometer (Rigaku Corporation; RINT-2000). Four peaks were selected in a descending order of peak intensity from a plurality of peaks detected from the X-ray diffraction pattern in the diffraction angle 2θ range of 15° to 45°, and the crystallite size B was calculated from the mean value of the half widths, using the Scherrer's equation. The ratio B/A was calculated from these results.

The Raman spectrum of the coating was measured to examine the intensity ratio $I_D/I_G$, using a Raman spectroscope (Renishaw; SYSTEM 2000). The intensity ratio $I_D/I_G$ of two peaks (a peak with intensity $I_D$ in the 1,250 $cm^{-1}$ to 1,350 $cm^{-1}$ range, and a peak with intensity $I_G$ in the 1,500 $cm^{-1}$ to 1,700 $cm^{-1}$ range) was calculated from the measurement result.

Figure 5:
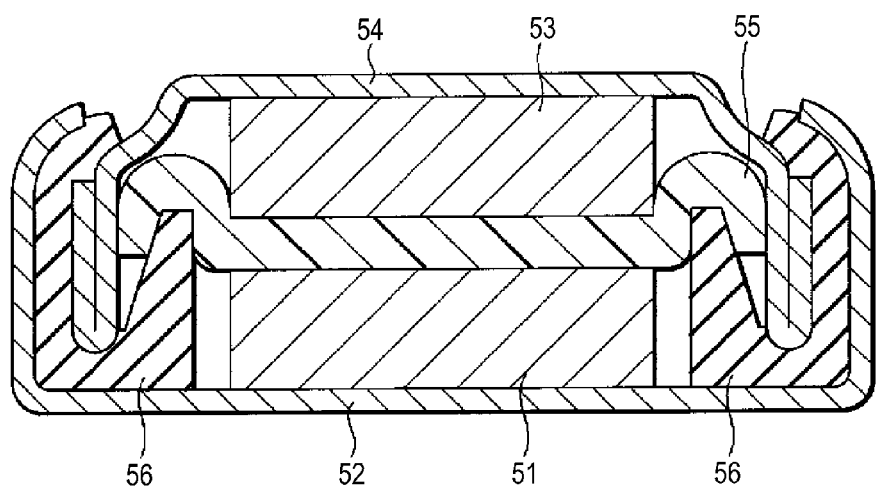
FIG. 5 is a cross sectional view illustrating the configuration of a test secondary battery (coin-shaped secondary battery).

The positive electrode active materials so obtained were used to fabricate coin-shaped secondary batteries (FIG. 5) according to the following procedure.

The coin-shaped secondary battery includes an exterior canister 52 and an exterior cup 55 laminated via a separator 55 impregnated with an electrolytic solution, and swaged via a gasket 56. A test electrode 51 using the positive electrode active material is housed in the exterior canister 52, and a counter electrode 53 is attached to the exterior cup 54.

The test electrode 51 was fabricated by forming a pellet from a mixture of the positive electrode active material (a Li complex oxoacid salt of an olivine structure; 50 parts by mass), and the positive electrode conductive agent Ketjen black (50 parts by mass). A Li metal plate was used as the counter electrode 53. The electrolytic solution was prepared by mixing the solvents ethylene carbonate (EC) and dimethyl carbonate (DMC), and dissolving the electrolyte salt $LiPF_6$.

Here, the solvent had the composition (mass ratio) EC:DMC=50:50, and the electrolyte salt content was 1 mol/$dm^3$ (=1 mol/l) with respect to the solvent. A polypropylene porous film was used as the separator 55.

Various characteristics of the secondary batteries were examined. The results are presented in Table 2.

Resistance characteristic was examined in a charged state at 80% charge depth by electrochemically inserting the lithium ions in the repeated cycle of 1C constant-current charging and at least 5 hours of relaxation. The direct current resistivity (kΩ·cm) was then determined by Ohm's law from the voltage difference (the difference between the voltage immediately before the start of relaxation and the voltage after the relaxation) and the current value. Here, for convenience, the capacity for the 20-hour constant-current constant-voltage charging to a Li metal potential of 4.35 V at 0.1 C current was regarded as the 100% charged state. Note that "1 C" and "0.1 C" are the current values with which the theoretical capacity fully discharges in 1 hour and 10 hours, respectively.

Input-output characteristic was examined by measuring the charge capacity (mAh/g) for the 2.5-hour constant-current constant-voltage charging to a Li metal potential of 4.35 V at 1 C current. The discharge capacity (mAh/g) for the 20-hour constant-current constant-voltage charging to a Li metal potential of 4.35 V at 0.1 C, followed by the discharge to a Li metal potential 2.0 V at 3 C current was also measured. Note that "3 C" is the current value with which the theoretical capacity fully discharges in ⅓ hours.

TABLE 1

Positive electrode active material: Li complex phosphate (olivine structure)

| Experiment example | Molar ratio | | | | Bead diameter (mm) | Calcine Temperature (° C.) | Time (min) |
|---|---|---|---|---|---|---|---|
| | Li | Mn | Fe | P | | | |
| 1 | 1.00 | 0.75 | 0.25 | 1.00 | 0.05 | 600 | 180 |
| 2 | 1.00 | 0.75 | 0.25 | 1.00 | 0.05 | 650 | 180 |
| 3 | 1.00 | — | 1.00 | 1.00 | 0.05 | 600 | 180 |
| 4 | 1.00 | — | 1.00 | 1.00 | 0.05 | 650 | 180 |
| 5 | 1.00 | 0.75 | 0.25 | 1.00 | 0.3 | 600 | 180 |
| 6 | 1.00 | 0.75 | 0.25 | 1.00 | 0.05 | 500 | 180 |
| 7 | 1.00 | 0.75 | 0.25 | 1.00 | 0.05 | 750 | 180 |
| 8 | 1.00 | 0.75 | 0.25 | 1.00 | 0.3 + 0.05 | 600 | 180 |
| 9 | 1.00 | 0.75 | 0.25 | 1.00 | 0.05 | 600 | 5 |
| 10 | 1.00 | — | 1.00 | 1.00 | 0.3 | 600 | 180 |
| 11 | 1.00 | — | 1.00 | 1.00 | 0.05 | 750 | 180 |
| 12 | 1.00 | 0.75 | 0.25 | 1.00 | 0.3 | 600 | 1440 |

TABLE 2

Positive electrode active material: Li complex phosphate (olivine structure)

| Experiment Example | Median diameter (nm) | | | Pore size A (nm) | Crystallite size B (nm) | Ratio B/A | Intensity ratio $I_D/I_G$ | DC resistivity (kΩ·cm) | Charge capacity (mAh/g) | Discharge capacity (mAh/g) |
|---|---|---|---|---|---|---|---|---|---|---|
| | D10 | D50 | D90 | | | | | | | |
| 1 | 48 | 63 | 78 | 45 | 31 | 0.69 | 0.67 | 6.0 | 156 | 147 |
| 2 | 53 | 73 | 97 | 46 | 32 | 0.70 | 0.74 | 6.4 | 153 | 152 |
| 3 | 45 | 58 | 74 | 45 | 41 | 0.91 | 0.74 | 6.5 | 151 | 149 |
| 4 | 58 | 69 | 88 | 51 | 42 | 0.82 | 0.77 | 6.4 | 152 | 148 |
| 5 | 45 | 60 | 78 | 45 | 30 | 0.67 | 0.58 | 7.0 | 150 | 140 |
| 6 | 74 | 95 | 127 | 100 | 37 | 0.37 | 0.68 | 10.9 | 136 | 118 |
| 7 | 61 | 83 | 108 | 51 | 32 | 0.63 | 0.76 | 8.1 | 139 | 80 |
| 8 | 58 | 72 | 118 | 45 | 34 | 0.76 | 0.74 | 9.3 | 126 | 98 |
| 9 | 40 | 70 | 85 | 45 | 18 | 0.40 | 0.66 | 12.4 | 135 | 105 |

TABLE 2-continued

| | Positive electrode active material: Li complex phosphate (olivine structure) | | | | | | | | |
|---|---|---|---|---|---|---|---|---|---|
| Experiment | Median diameter (nm) | | | Pore size A | Crystallite size B | Ratio | Intensity | DC resistivity | Charge capacity | Discharge capacity |
| Example | D10 | D50 | D90 | (nm) | (nm) | B/A | ratio $I_D/I_G$ | (kΩ·cm) | (mAh/g) | (mAh/g) |
| 10 | 84 | 102 | 123 | 103 | 45 | 0.44 | 0.72 | 7.9 | 149 | 102 |
| 11 | 64 | 95 | 114 | 51 | 47 | 0.92 | 0.77 | 11.7 | 120 | 85 |
| 12 | 71 | 101 | 132 | 102 | 58 | 0.57 | 0.71 | 9.3 | 138 | 123 |

The direct current resistivity was lower, and the high-load charge capacity and discharge capacity were higher when the series of parameters for the positive electrode active material were all confined in the appropriate ranges (Experiment Examples 1 to 5) than when these conditions were not satisfied (Experiment Examples 6 to 12). The appropriate ranges of these parameters are as follows. Median diameter: 1 nm<D10<65 nm, 5 nm<D50<75 nm, and 50 nm<D90<100 nm. Maximum peak pore size A: 10 nm≤A≤75 nm. The ratio B/A of pore size A and crystallite size B: 0.5<B/A≤1. The results were particularly desirable when the intensity ratio $I_D/I_G$ was 0.65 or more.

These results indicate the following trends. The particle size and crystallinity of the primary particles have effects on the storage and release of the lithium ions in the positive electrode active material. Specifically, when the particle size of the primary particles is non-uniform and large, the positive electrode active material cannot easily store and release the lithium ions, irrespective of the crystallinity. On the other hand, when the particle size of the primary particles is uniform and small, the storage and release of lithium ions occurs easily when the crystallinity is high, whereas the storage and release of lithium ions becomes difficult at low crystallinity. Thus, the positive electrode active material specifically has low resistance, and high charge capacity and high discharge capacity even under a high load when the primary particles have uniform and small particle sizes and high crystallinity (Experiment Examples 1 to 5).

Experiment Examples 13 and 14

Li complex oxides of a spinel structure were obtained as the negative electrode active material according to the following procedure.

Lithium hydroxide monohydrate (LiOH.H$_2$O) and anatase-type titanium oxide(IV) (TiO$_2$) were weighed and mixed at a Li:Ti molar ratio of 4:5 in a total of 600 g. The mixture was charged into deionized water (4 dm$^3$), and stirred to obtain a slurry. After further being stirred thoroughly in a tank, the slurry was charged into the vessel of the bead mill, and wet pulverized. Here, ZrO$_2$ beads were used, and the mill was run at a rim speed of 12 m/s for 120 min. The ZrO$_2$ beads had a bead size of 0.05 mm (Experiment Example 13) or 0.3 mm (Experiment Example 14). The resulting pulverized slurry was dry granulated by spray drying at an intake air temperature of 200° C. to obtain a precursor powder. Finally, the precursor powder was calcined in the atmosphere (750° C.×3 hr) to obtain a Li complex oxide. A series of parameters for the negative electrode active materials are presented in Table 3.

The input-output characteristics of the lithium ion secondary batteries using these negative electrode active materials were examined. The results are presented in Table 3. The parameters of the negative electrode active materials, the configuration and producing method of the secondary batteries, and the measurement conditions of various characteristics are as described in Experiment Examples 1 to 12. Note, however, that the input-output characteristics were examined by measuring the charge capacity for the 5-hour constant-current constant-voltage charging to a Li metal potential of 1.0 V at 0.5 C current, followed by charging to a Li metal potential of 2.0 V at 3 C.

TABLE 3

| | Negative electrode active material: Li complex oxide (spinel structure) | | | | | | | | |
|---|---|---|---|---|---|---|---|---|---|
| Experiment | Molar ratio | | Median diameter (nm) | | | Pore size A | Crystallite size B | | Charge capacity | Discharge capacity |
| Example | Li | Ti | D10 | D50 | D90 | (nm) | (nm) | Ratio B/A | (mAh/g) | (mAh/g) |
| 13 | 4 | 5 | 28 | 52 | 90 | 40 | 35 | 0.88 | 173 | 170 |
| 14 | 4 | 5 | 50 | 97 | 134 | 102 | 45 | 0.44 | 162 | 132 |

The results obtained for the positive electrode active materials (Table 2) were also obtained for the negative electrode active materials. Specifically, the direct current resistivity was lower, and the high-load charge capacity and discharge capacity were higher when the series of parameters for the negative electrode active material were all confined in the appropriate ranges (Experiment Example 13) than when these conditions were not satisfied (Experiment Example 14).

It can be said from the results presented in Tables 1 to 3 that the lithium ion input-output characteristics improve when at least one of the positive electrode and the negative electrode contains the active material that is capable of storing and releasing lithium ions and that satisfies the foregoing four conditions.

While the present technology has been described based on certain embodiments and examples, the present technology is not limited to the foregoing embodiments and examples, and various modifications are possible. For example, the positive electrode active material of the embodiment of the present technology is also applicable to a lithium ion secondary battery in which the negative electrode capacity includes the lithium ion storage and release capacity and the capacity associated with the deposition and dissolution of the lithium metal, and is represented by the sum of these capacities. In this case, the chargeable capacity of the negative electrode material is made smaller than the positive electrode discharge capacity.

Further, even though the battery structure was described as being cylindrical or a laminate film, or the battery element was described as having a wound structure in the foregoing embodiments and examples, the present technology is not limited to these. The lithium ion secondary battery of the embodiment of the present technology is also applicable to other battery structures, including coin-shaped, rectangular, and button-shaped structures, and to battery elements of other structures, including a laminate structure.

The present disclosure contains subject matter related to that disclosed in Japanese Priority Patent Application JP 2011-104266 filed in the Japan Patent Office on Mar. 9, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A lithium ion secondary battery comprising:
a positive electrode;
a negative electrode that includes a negative electrode active material; and
an electrolytic solution,
at least one of the positive electrode and the negative electrode being capable of storing and releasing lithium ions, and containing an active material that is at least one of a positive electrode active material and the negative electrode active material, the active material satisfying the following conditions (A) to (D):
(A) the active material being a Li complex oxide or a Li complex oxoacid salt that contains lithium, oxygen, and at least one of the elements of Groups 2 to 15 of the long-form periodic table;
(B) the active material containing a plurality of primary particles having a particle size distribution (median diameter: nm) with 1 nm <D10<65 nm, 5 nm <D50<75 nm, and 50 nm <D90<100 nm;
(C) the active material having a plurality of pores between the plurality of primary particles, wherein the maximum peak pore size A (nm) in a pore size distribution as measured by a mercury intrusion technique is 10 nm≤A≤75 nm; and
(D) the ratio B/A of the maximum peak pore size A (nm) and the crystallite size B (nm) determined from the half width of the X-ray diffraction pattern of the active material as measured by X-ray diffractometry is 0.5<B/A≤1;
wherein the negative electrode active material comprises, or further comprises, carbon.

2. The lithium ion secondary battery according to claim 1, wherein the active material includes a carbon material-containing coating on at least a part of the surface of the primary particles, the coating having a Raman spectrum with an intensity ratio ($I_D/I_G$) of 0.65 or more between a peak (intensity $I_D$) in a 1,250 cm$^{-1}$ to 1,350 cm$^{-1}$ range and a peak (intensity $I_G$) in a 1,500 cm$^{-1}$ to 1,700 cm$^{-1}$ range as measured by Raman spectroscopy.

3. The lithium ion secondary battery according to claim 2, wherein the weight ratio of the coating with respect to the primary particles is 0.01 weight % to 10 weight %.

4. The lithium ion secondary battery according to claim 1, wherein the active material is contained in the positive electrode, and the positive electrode active material has a direct current resistivity of 7.5 kΩ·cm or less in a charged state with 80% charge depth.

5. The lithium ion secondary battery according to claim 1, wherein active material is contained in the positive electrode, and the positive electrode active material has a laminar rock salt structure, a spinel structure, or an olivine structure, and wherein the negative electrode active material has a spinel structure.

6. The lithium ion secondary battery according to claim 5, wherein the positive electrode active material is at least one of the compounds of the formulae (1) to (3) below, and wherein the active material contained in the negative electrode is at least one of the compounds of the formulae (4) to (6) below $$Li_aM1O_2 \qquad (1)$$

(where M1 is at least one of the elements of Groups 2 to 15 of the long-form periodic table, and a satisfies 0<a≤1.2), $$Li_bMn_cM2_dO_4 \qquad (2)$$

(where M2 is at least one of the elements of Groups 2 to 15 of the long-form periodic table (excluding Mn), and b, c, and d satisfy 0<b≤1, 0<c≤2, 0≤d<2, and c+d=2), $$Li_eM3_fPO_4 \qquad (3)$$

(where M3 is at least one of the elements of Groups 2 to 15 of the long-form periodic table, and e and f satisfy 0<e≤1, and 0<f≤1), $$Li[Li_xM4_{(1-3x)/2}Ti_{(3+x)/2}]O_4 \qquad (4)$$

(where M4 is at least one of Mg, Ca, Cu, Zn, and Sr, and x satisfies 0≤x≤⅓), $$Li[Li_yM5_{1-3y}Ti_{1+2y}]O_4 \qquad (5)$$

(where M5 is at least one of Al, Sc, Cr, Mn, Fe, Ga, and Y, and y satisfies 0≤y≤⅓), and $$Li[Li_{1/3}M6_zTi_{(5/3)-z}]O_4 \qquad (6)$$

(where M6 is at least one of V, Zr, and Nb, and z satisfies 0≤z≤⅔).

7. The lithium ion secondary battery according to claim 6, wherein the M1 is at least one of Ni, Co, Mn, Cu, Fe, Zn, Y, Ti, Mo, Al, Mg, B, V, Cr, Sn, Ca, Sr, and W,
wherein the M2 is at least one of Co, Ni, Mg, Al, B, Ti, V, Cr, Fe, Cu, Zn, Mo, Sn, Ca, Sr, and W, and
wherein the M3 is at least one of Co, Mn, Fe, Ni, Mg, Al, B, Ti, V, Nb, Cu, Zn, Mo, Ca, Sr, W, and Zr.

8. A negative electrode for lithium ion secondary batteries, the negative electrode comprising a negative electrode active material capable of storing and releasing lithium ions, the negative electrode satisfying the following conditions (A) to (D):
(A) the negative electrode active material being a Li complex oxide or a Li complex oxoacid salt that contains lithium, oxygen, and at least one of the elements of Groups 2 to 15 of the long-form periodic table;
(B) the negative electrode active material containing a plurality of primary particles having a particle size distribution (median diameter: nm) with 1 nm<D10<65 nm, 5 nm<D50 <75 nm, and 50 nm<D90<100 nm;
(C) the negative electrode active material having a plurality of pores between the plurality of primary particles, wherein the maximum peak pore size A (nm) in a pore size distribution as measured by a mercury intrusion technique is 10 nm≤A≤75 nm; and (D) the ratio B/A of the maximum peak pore size A (nm) and the crystallite size B (nm) determined from the half width of the X-ray diffraction pattern of the negative electrode active material as measured by X-ray diffractometry is 0.5<B/A≤1;

wherein the negative electrode active material further comprises carbon.

9. A negative active material for lithium ion secondary batteries, the negative active material capable of storing and releasing lithium ions, the negative active material satisfying the following conditions (A) to (D):
   (A) the negative electrode active material being a Li complex oxide or a Li complex oxoacid salt that contains lithium, oxygen, and at least one of the elements of Groups 2 to 15 of the long-form periodic table;
   (B) the negative electrode active material containing a plurality of primary particles having a particle size distribution (median diameter: nm) with 1 nm<D10<65 nm, 5 nm<D50 <75 nm, and 50 nm<D90<100 nm;
   (C) the negative electrode active material having a plurality of pores between the plurality of primary particles, wherein the maximum peak pore size A (nm) in a pore size distribution as measured by a mercury intrusion technique is 10 nm≤A ≤75 nm; and
   (D) the ratio B/A of the maximum peak pore size A (nm) and the crystallite size B (nm) determined from the half width of the X-ray diffraction pattern of the negative electrode active material as measured by X-ray diffractometry is 0.5<B/A≤1;

wherein the negative electrode active material further comprises carbon.

10. An electronic device comprising the lithium ion secondary battery of claim 1.

11. An electric power tool comprising the lithium ion secondary battery of claim 1.

12. An electric vehicle comprising the lithium ion secondary battery of claim 1.

13. A power storage system comprising the lithium ion secondary battery of claim 1.

\* \* \* \* \*